(12) United States Patent
Fünfschilling et al.

(10) Patent No.: US 6,271,906 B1
(45) Date of Patent: *Aug. 7, 2001

(54) LIQUID CRYSTAL CELLS FOR INTEGRATED OPTICAL COMPONENTS AND A METHOD OF MANUFACTURING THEM

(75) Inventors: Jürg Fünfschilling; Peter Grütter, both of Basel; Hans-Josef Hug, Pratteln, all of (CH); Thomas A. Jung, Lake Peekskill, NY (US); Udo Schwarz, Basel (CH)

(73) Assignee: Rolic AG, Basel (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/889,482

(22) Filed: Jul. 8, 1997

Related U.S. Application Data

(63) Continuation of application No. 08/720,760, filed on Oct. 1, 1996, now abandoned, which is a continuation of application No. 08/317,277, filed on Oct. 4, 1994, now abandoned, which is a continuation of application No. 08/198,810, filed on Feb. 18, 1994, now abandoned, which is a continuation of application No. 07/984,036, filed on Dec. 1, 1992, now abandoned.

(30) Foreign Application Priority Data

Dec. 5, 1991 (CH) .................................................. 3570/91

(51) Int. Cl.⁷ .................................................. G02F 1/1337

(52) U.S. Cl. ........................... 349/124; 349/126; 349/129

(58) Field of Search .................................... 349/124, 126, 349/129

(56) References Cited

U.S. PATENT DOCUMENTS

| 3,963,310 | 6/1976 | Giallorenzi et al. ................ 349/196 |
| 3,966,304 | 6/1976 | Kakeda ................................ 349/129 |
| 4,986,638 | 1/1991 | Yamazaki et al. .................. 349/172 |

(List continued on next page.)

FOREIGN PATENT DOCUMENTS

| 3234074 | 9/1982 | (DE) . |
| 0 525 478 | 7/1992 | (EP) . |
| 57/192926 | 11/1982 | (JP) . |
| 61/51124 | 3/1986 | (JP) . |
| 61/51125 | 3/1986 | (JP) . |
| 90/15986 | 12/1990 | (WO) . |

OTHER PUBLICATIONS

Wolff et al., *Molecular Crystals and Liquid Crystals*, vol. 23, pp. 187–196 (1973).

(List continued on next page.)

*Primary Examiner*—William L. Sikes
*Assistant Examiner*—Julie Ngo
(74) *Attorney, Agent, or Firm*—Finnegan, Henderson, Farabow, Garrett & Dunner, L.L.P.

(57) ABSTRACT

Liquid cell crystal, with fine structures made up of regions having defined different orientation and dimensions of the order of 0.1 to about 100 µm can be used as optical conductors and projection displays. The fine structures in the liquid crystals are produced in that the plates bounding and guiding the liquid crystal are provided with micromechanically produced regions having different defined preferred directions. The result is a molecular orientation having a higher refractive index that the surrounding region for guiding and polarizing irradiated light. The orienting layers on the plates bounding the liquid crystal are micromechanically structured in that certain spatial regions are mechanically structured in a uniform direction by a stylus moved by piezoelectric means.

6 Claims, 2 Drawing Sheets

U.S. PATENT DOCUMENTS

Figure 1:
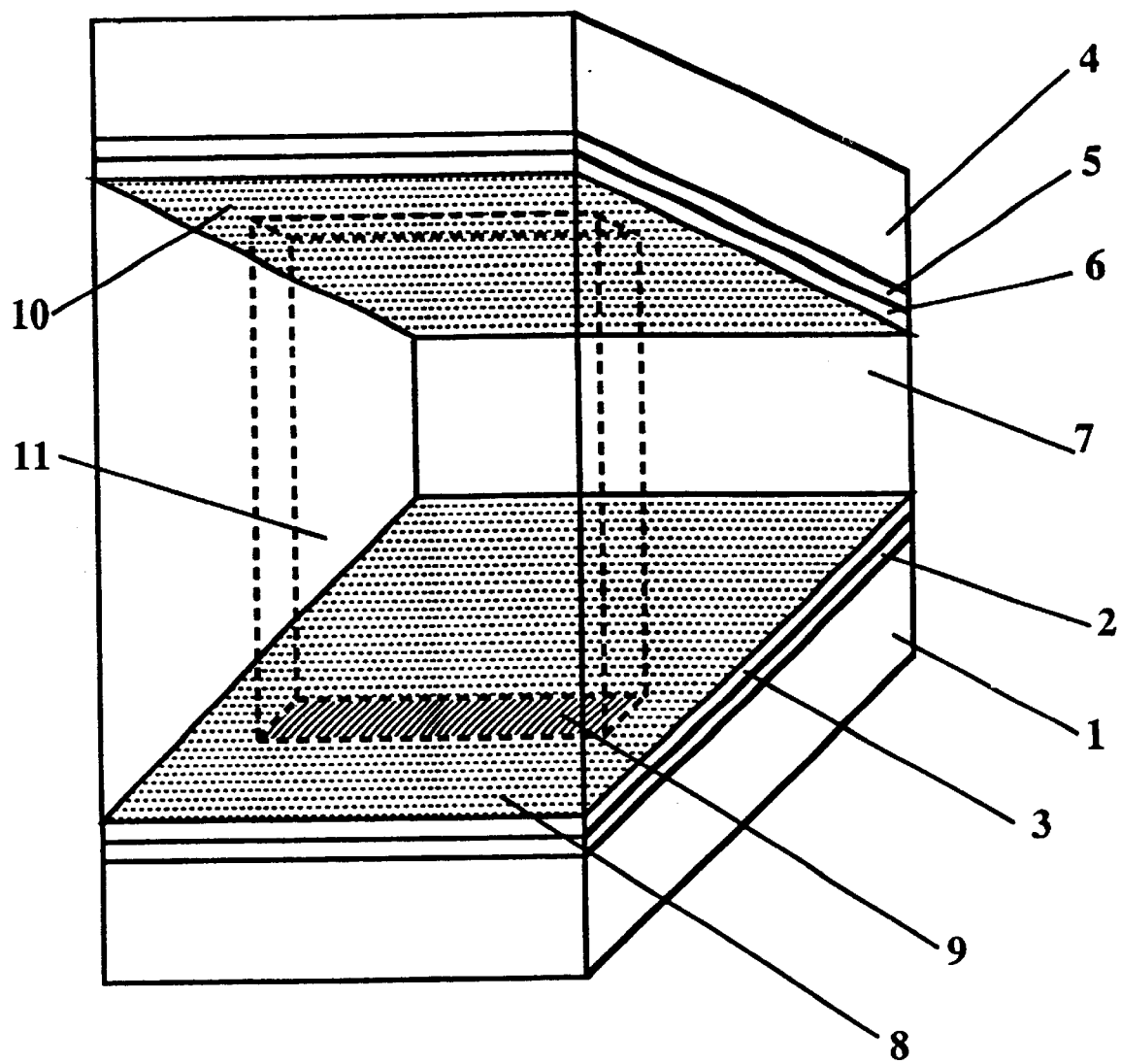

| | | | |
|---|---|---|---|
| 5,011,270 | 4/1991 | Yamazaki et al. | 349/172 |
| 5,032,009 | 7/1991 | Gibbons et al. | 349/124 |
| 5,046,831 | 9/1991 | Yamazaki et al. | 349/172 |
| 5,073,294 | 12/1991 | Shannon et al. | 349/24 |
| 5,150,236 | 9/1992 | Patel | 349/198 |
| 5,182,665 | 1/1993 | O'Callaghan et al. | 349/201 |
| 5,389,698 | 2/1995 | Chigrinov et al. | 349/124 |

OTHER PUBLICATIONS

IBM Technical Disclosure Bulletin, vol. 33, No. 1B, pp. 199–200 (Jun. 1990).

Patent Abstracts of Japan, vol. 7, No. 42 (1187), p. 177 (1983) of JP–A–57/192,926(1982).

El–Sheriff et al., *Applied Optics*, vol. 25, No. 15. pp. 2469–2470 (1986).

Derwent Abstract L03 U14 P81 P85 R31 (1982) of DE 3234074.

Ringger et al., IBM Journal of Research and Development, vol. 30, No. 5, pp. 500–507 (Sep. 5, 1986).

Derwent Abstract A85 L03 P81 U14 (1992) of EP 0 525 478 A2.

LIQUID CRYSTAL CELLS FOR INTEGRATED OPTICAL COMPONENTS AND A METHOD OF MANUFACTURING THEM

This is a continuation, of application Ser. No. 08/720,760 filed Oct. 1, 1996, now abandoned which is a Rule 60 Continuation of Ser. No. 08/317,277, filed Oct. 4, 1994, now abandoned, which is a Rule 60 Continuation of Ser. No 08/198,810, filed Feb. 18, 1994, now abandoned, which is a Rule 60 Continuation of Ser. No. 07/984,036, filed Dec. 1, 1992, now abandoned.

FIELD OF THE INVENTION

The invention relates to liquid crystal cells with fine structures made up of regions having defined different orientations. The invention also relates to optical conductors made up of the aforementioned fine structures, and to a method of manufacturing such structures.

BACKGROUND OF THE INVENTION

For the purpose of this description, fine structures are defined as two-dimensional or three-dimensional extensions of the order of 0.1 to 100 $\mu$m.

It is known to produce the aforementioned fine structures in liquid crystal layers by applying an electric field to suitably segmented electrodes. In the region exposed to the electric field, the orientation of the liquid crystal is changed relative to the surrounding field-free regions. This usually results in a change in the optical properties of the effected region, and is therefore the basis of the electro-optical display effects of liquid crystal cells.

It is also known to produce fine structures in liquid crystal cells which have formed in a field-free state. To this end, the wall orientation of the liquid-crystal molecules is brought about by oriented photopolymers. The molecules can be variously aligned to produce orientation patterns in the liquid crystal (see Swiss Patent Application 2244/91 and 2246/91 dated Jul. 26, 1991).

These orientation patterns can be used, for example, for producing liquid crystal cells containing patterns made up of regions having different preferred orientation, patterns of regions with and without preferred orientations, or patterns of regions of varying twist, i.e. patterns of TN and STN regions.

SUMMARY OF THE INVENTION

An unexpected discovery has now been made. Fine structures of the aforementioned kind can be produced by micromechanical surface treatment of the plates bounding the liquid crystal. According to the invention, the initially-mentioned liquid crystal cells are characterized in that the plates bounding and orienting the liquid crystal have micro-mechanically produced regions with different defined preferential directions.

It has also been found that these fine structures can be used in relatively simple manner to produce optical conductors. As is known, the precondition for optical conduction is total reflection at the boundary surfaces of the optical conductor, i.e. the boundary surfaces must have a change in refractive index from a higher value inside the optical conductor to a lower value outside.

According to the invention, optical conducting regions in a liquid crystal can be produced in that the region is given a fine structure to produce a molecular orientation having a higher refractive index than the surrounding regions for guiding and polarizing irradiated light.

Another aim of the invention is to provide a method of producing the aforementioned fine structures. A method for this purpose according to the invention comprises micromechanical structuring of the orientation layers on the plates bounding the liquid crystal. Preferably in this method, a given two-dimensional region is mechanically structured in a uniform direction by a stylus moved by piezoelectric means.

Liquid crystals have properties which are important for manufacture of optically conducting structures. They have high optical anisotropy, their orientation can be controlled by boundary conditions, and they have very powerful electro-optical effects in quasi-static operation. Some newly-developed ferroelectric liquid crystals also have high optical non-linearity. Also, liquid crystals can be used in simple manner to produce thin layers.

Accordingly, conventional (nematic) liquid crystals can be used to produce slow (static) switching networks. If however ferroelectric liquid crystals are used, extremely short switching times <<<1 ns via the Pockels effect) are also attainable.

In light-conducting structures also, the light energy is concentrated in a very small volume, so that efficient frequency doubling and mixing are possible.

DESCRIPTION OF THE PREFERRED EMBODIMENTS

Figure 2:
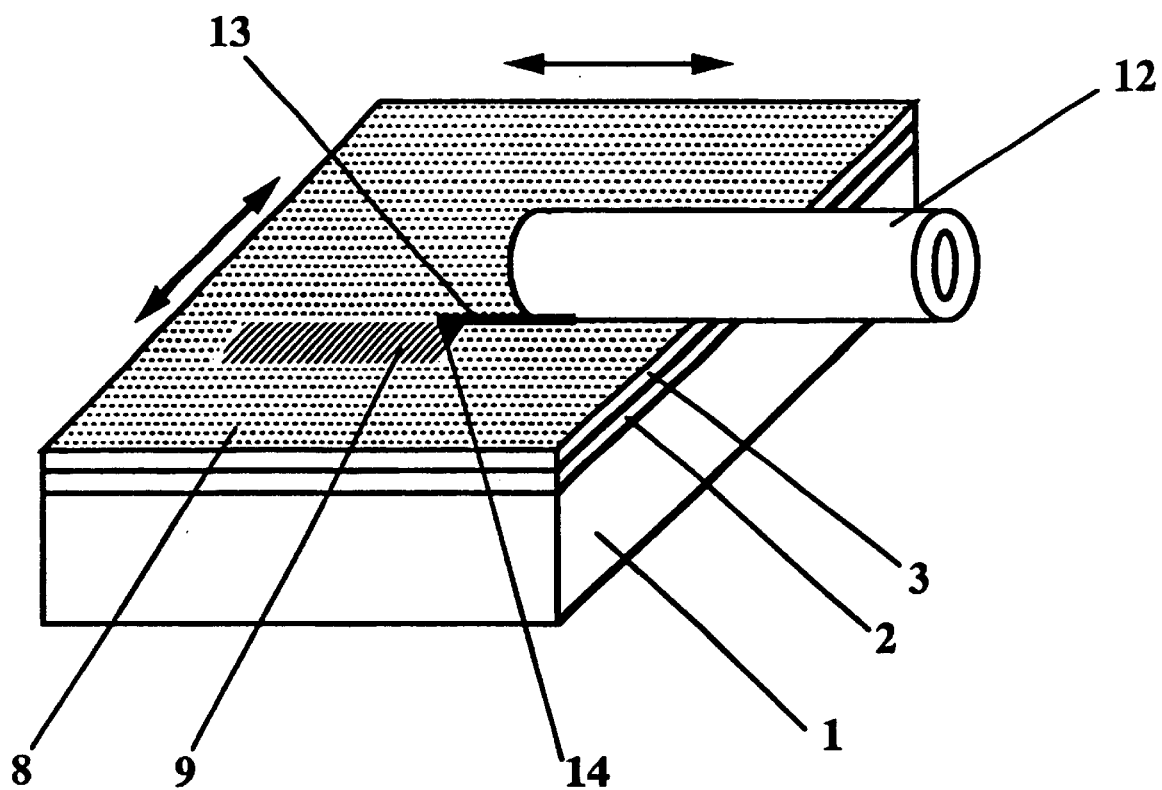

A preferred embodiment of the invention will now be described with reference to the accompanying drawings, in which:

FIG. 1 is a diagram of a liquid crystal cell with differently oriented regions and FIG. 2 is a diagram of a device for "inscribing" microstructures.

FIG. 1 shows a liquid crystal cell comprising two parallel spaced-apart glass plates 1 and 4. The bottom glass plate 1 has an ITO electrode coating 2, covered with a polymer orientation layer 3. Similarly the top glass plate 4 has an ITO electrode coating 5 and a polymer orientation layer 6. A nematic liquid crystal layer 7 is disposed in the space between the two plates.

The polymer layer 3, over most of its surface, has a surface structure 8 which orients the adjacent molecules in the liquid crystal 7 in the direction shown by chain lines 8. The polymer layer 6 in the top plate 4 has a surface structure 10 parallel thereto. The parallel alignment of the wall orientations of the two plates results in known manner in uniform alignment of the entire liquid crystal 7. This liquid-crystal structure is called homogeneous or planar.

This homogeneous liquid crystal layer, oriented in one direction, is provided according to the invention with a strip a few $\mu$m wide having a different orientation and produced according to the invention as follows: the polymer layer 3 is structured in a direction different from the remaining area, e.g. at right-angles to the orientation 8, in a given limited region 9 on the surface of the bottom plate 1. The liquid crystal molecules adjacent the region 9 are aligned in the aforementioned different direction by the wall orientation forces.

Owing to the co-operating interacting forces of the liquid crystals molecules, the aforementioned different alignment extends into the liquid crystal. The wall orientation at the opposite side, i.e. on the top plate, is not altered, i.e. is parallel to direction 8. The result is a twisted molecule arrangement (TN or rotary-cell configuration) in the space 11 defined by the area 9 and shown by chain lines. This strip-like space 11 acts as an optical conductor, the optical conduction of both sides of the strip being brought about by the defined difference in refractive index between the differently oriented spatial regions of the liquid crystal and, on the underside, by the lower refractive index of the glass. At the top, the twisted molecular arrangement results in a refractive-index gradient which causes light to be conducted. Conduction of light through he glass plate is also operative at the top, however, depending on the thickness of the liquid crystal layer.

Alternatively the polymer layer on the top plate 4 can likewise be given a different fine structure corresponding to the area 9. If the two facing fine-structured areas have parallel orientation directions, the corresponding spatial region 11 will be uniformly aligned, i.e. uniaxial.

Another alternative is to give one or both plates a homoeotropic instead of a planar general wall orientation. The homoeotropic molecular arrangement also has a lower refractive index than the space 11.

The area 9 is structured by the device shown in FIG. 2, e.g. as follows: the plate 1, whose polymer layer 3 has already been oriented in the preferred direction 8, e.g. by grinding, is made movable in the two directions indicated by double arrows. A stylus 14 attached to a piezo-tube 12 by a spring 13 is disposed above the plate. This arrangement corresponds to the known scanning means in a atomic force microscope.

By electrical actuation of the piezo-tube 12, the stylus 14 is moved in any arbitrary desired direction. The stylus can be simply moved in reciprocation over the polymer layer 3 at a right angle to the direction of motion of the plate 1, as in the present example, whereas plate 1 can be slowly moved in the direction of the existing orientation 8. The pressure on stylus 14 can be monitored as in the aforementioned atomic force microscope.

The motion of the stylus 14 in contact with the polymer layer 3 provides the layer with a structure which can be imagined as fine engraved lines, the lines extending in the direction of motion of the stylus. The space between lines, which is typically in the nm region, depends on the speed at which the plate is moved.

The stylus 14 can also be moved over the polymer layer at an angle $\phi$ different from 90° to the motion of the plate 1, so that the structural lines extend at the angle $\phi$ to the orientation 8. This "sloping" structuring is useful e.g. for $S_c$ material, where the molecules are at an angle to the wall orientation. Structuring at the appropriate angle results in an exactly transverse molecular alignment in the space 11.

On the other hand, the refractive index of the liquid crystal can be varied by deliberately sloping the molecules in the space 11, e.g. for phase-matching in the application to frequency-doubling.

The tilt of the liquid crystal molecules can also be influenced by structuring. If all the lines are drawn by the stylus 14 in the same direction, i.e. if the stylus touches the surface in only one direction and is lifted during the return movement, the resulting line structure tilts the molecules.

The micromechanical structuring can also be produced by other means, e.g. by embossing the special structure in the polymer layer. Also, in all the methods the special structuring of the selected surfaces can be produced simultaneously at a number of places, e.g. by styluses or embossing devices disposed in a pattern.

The light can be coupled in the optically conducting space by known means, using an interference grating (not shown). The same applies to coupling out the light. These gratings can also be produced by the stylus, by suitable choice of the parameters for structuring. The gratings can also be embossed in known manner.

Non-nematic, e.g. ferroelectric liquid crystals can also advantageously be used. Nematic liquid crystals form components which are static or electro-optically relatively slow. ferroelectric liquid crystals are preferred for rapid electro-optical switching processes, particularly crystals with high optical non-linearity and frozen in a vitreous state at room temperature.

The electrode layers 2, 5 on the two plates 1, 4 can also be segmented in suitable manner, depending on the intended use of the cells.

The previously-described method can also be used to obtained more complicated structures such as Mach-Zehnder interferometers. This, in combination with the powerful electro-optical effects in liquid crystals, opens the way to integrated optics with complex switching networks.

In addition to the production of optical conductors, the fine structuring according to the invention can also be used for producing liquid crystal display cells as described in the initially-mentioned Swiss Patent Application 2246/91 date Jul. 26, 1991. More particularly the method according to the invention can advantageously be used to produce a cell similar to that described in the citation and having a chess-board arrangement of adjacent spaces with different molecular configurations. To this end the entire polymer layer 3 on plate 1 is provided with a chess board arrangement of surface regions, micromechanically structure in different orientation directions. The facing, plate can either be structured in the same manner or treated so that it homoeotropically orients the liquid crystal. The liquid crystal has differently oriented spatial regions corresponding to the aforementioned wall orientation or orientations.

A liquid crystal shaped in this manner scatters incident light, provided the dimensions of the individual areas are in the light wavelength range, and is therefore opaque. If an electric field is applied, the liquid crystal molecules are aligned and transmit light. The result therefore is a simple electro-optical switch.

Optically, the cell behaves like the first commercially-obtainable cells during the initial period of liquid crystal technology, based on the dynamic scattering (DS) effect. The present cell is similar in that it requires no polarizers. In contrast to the DS cell, however, the present cell is based on a true field effect with all the advantages as regards current consumption, service life, etc.

If the actuating electrodes are suitably segmented, the aforementioned cells are also suitable for projection purposes.

What is claimed is:

1. A liquid crystal cell comprising plates bounding and orienting the liquid crystal wherein at least one plate has fine structures of micromechanically produced regions having different defined preferential directions and at least one region has at least one lateral dimension of between about 0.1 $\mu$m to about 100 $\mu$m.

2. A method of producing liquid crystal cells with fine structures according to claim 1, characterized in that a given spatial region is mechanically structured in a uniform direction by a moving stylus.

3. A method of manufacturing liquid crystals with fine structures according to claim 2, characterized in that the stylus is moved by piezoelectric means.

4. A light-conducting region in a liquid crystal cell with fine structures according to claim 1, characterized in that the region is given a fine structure to produce as molecular orientation having a higher refractive index than the surrounding regions for guiding and polarizing irradiated light.

5. A method of producing liquid crystal cells with fine structures having regions having plates bounding and orienting the liquid crystal plates having micromechanically produced regions with different defined preferential directions comprising mechanically structuring a given spatial region in a uniform direction by a moving stylus.

6. A method according to claim 6 wherein the stylus is moved by piezoelectric means.

* * * * *